(12) United States Patent      (10) Patent No.: US 9,368,868 B2
Sheynblat et al.      (45) Date of Patent: Jun. 14, 2016

(54) APPARATUS AND METHOD FOR SENSOR-BASED WIRELESS RECEIVE DIVERSITY

(75) Inventors: Leonid Sheynblat, Hillsborough, CA (US); Douglas N. Rowitch, Del Mar, CA (US); Ardalan Heshmati, Saratoga, CA (US)

(73) Assignee: QUALCOMM Incorporated, San Diego, CA (US)

(*) Notice: Subject to any disclaimer, the term of this patent is extended or adjusted under 35 U.S.C. 154(b) by 1058 days.

(21) Appl. No.: 11/932,628

(22) Filed: Oct. 31, 2007

(65) Prior Publication Data

US 2008/0112468 A1    May 15, 2008

Related U.S. Application Data

(60) Provisional application No. 60/863,631, filed on Oct. 31, 2006.

(51) Int. Cl.
| | |
|---|---|
| *H04M 1/00* | (2006.01) |
| *H01Q 3/24* | (2006.01) |
| *H01Q 21/28* | (2006.01) |
| *H04B 7/08* | (2006.01) |

(Continued)

(52) U.S. Cl.
CPC ........ *H01Q 3/24* (2013.01); *G01S 19/36* (2013.01); *G01S 19/49* (2013.01); *H01Q 21/28* (2013.01); *H04B 7/0805* (2013.01)

(58) Field of Classification Search
CPC ...... H04B 7/06; H04B 7/0686; H04B 7/0602; H04B 7/0613; H04B 7/0802; H04B 7/10

USPC ................. 455/101; 340/572.7, 572.1, 825.49
See application file for complete search history.

(56) References Cited

U.S. PATENT DOCUMENTS

| | | | |
|---|---|---|---|
| 5,163,176 A | * | 11/1992 | Flumerfelt et al. ........... 342/174 |
| 5,585,803 A | | 12/1996 | Miura et al. |
| 6,862,433 B2 | | 3/2005 | Callaway, Jr. |

(Continued)

FOREIGN PATENT DOCUMENTS

| | | |
|---|---|---|
| CN | 1639906 A | 7/2005 |
| CN | 101377544 A | 3/2009 |

(Continued)

OTHER PUBLICATIONS

International Search Report and Written Opinion—PCT/US2007/083227, International Search Authority—European Patent Office—Apr. 8, 2008.

*Primary Examiner* — Wesley Kim
*Assistant Examiner* — Richard Chan
(74) *Attorney, Agent, or Firm* — Arnold J. Gum

(57) ABSTRACT

An apparatus and method are disclosed for achieving receiver diversity. A wireless unit includes a plurality of antennas, an antenna selector to select one or more antennas from the plurality of antennas, a processor with input data from an inertial sensor for monitoring the orientation of the wireless unit. Based on the input data, the processor commands the antenna selector to select one or more antennas. In one aspect, the processor is a diversity processor. Based on the input data from the inertial sensor, the diversity processor computes the combination of the received signals. In another aspect, the wireless unit further includes a baseband processor to process the output of the diversity processor for a particular unit application.

24 Claims, 9 Drawing Sheets

(51) Int. Cl.
  *G01S 19/36* (2010.01)
  *G01S 19/49* (2010.01)

(56) References Cited

U.S. PATENT DOCUMENTS

| | | | |
|---|---|---|---|
| 7,250,901 | B2 | 7/2007 | Stephens et al. |
| 7,310,062 | B1* | 12/2007 | Hwang .................... 342/357.59 |
| 7,319,397 | B2 | 1/2008 | Chung et al. |
| 7,453,363 | B2* | 11/2008 | Reynolds .................. 340/572.7 |
| 7,626,544 | B2* | 12/2009 | Smith et al. .................. 342/386 |
| 7,844,378 | B2* | 11/2010 | Lange ............................. 701/50 |
| 7,855,678 | B2* | 12/2010 | Scherzinger et al. ..... 342/357.23 |
| 8,138,970 | B2* | 3/2012 | Whitehead et al. ...... 342/357.27 |
| 2002/0042675 | A1* | 4/2002 | Takahashi .................... 701/213 |
| 2003/0227414 | A1 | 12/2003 | Saliga et al. |
| 2004/0087294 | A1 | 5/2004 | Wang |
| 2004/0152420 | A1 | 8/2004 | Redi et al. |
| 2004/0196813 | A1 | 10/2004 | Ofek et al. |
| 2005/0110676 | A1 | 5/2005 | Heppe et al. |
| 2005/0270228 | A1* | 12/2005 | Stephens ....................... 342/146 |
| 2006/0080030 | A1 | 4/2006 | Okude et al. |
| 2006/0232468 | A1 | 10/2006 | Parker et al. |
| 2008/0086249 | A1* | 4/2008 | Lange ............................. 701/41 |
| 2009/0121932 | A1* | 5/2009 | Whitehead et al. ...... 342/357.12 |
| 2010/0130125 | A1 | 5/2010 | Nurmi |
| 2010/0164831 | A1 | 7/2010 | Rentz et al. |
| 2010/0330940 | A1 | 12/2010 | Sheynblat et al. |
| 2012/0007713 | A1 | 1/2012 | Nasiri et al. |

FOREIGN PATENT DOCUMENTS

| | | |
|---|---|---|
| CN | 101529652 A | 9/2009 |
| DE | 10125474 A1 | 12/2002 |
| EP | 1033781 A2 | 9/2000 |
| EP | 1335618 A2 | 8/2003 |
| EP | 1772982 A1 | 4/2007 |
| GB | 2423191 | 8/2006 |
| JP | 2000236205 A | 8/2000 |
| JP | 2002152114 A | 5/2002 |
| JP | 2002290315 A | 10/2002 |
| JP | 2002540714 | 11/2002 |
| JP | 2003167044 A | 6/2003 |
| JP | 2003235072 A | 8/2003 |
| JP | 2003283405 A | 10/2003 |
| JP | 2004328330 A | 11/2004 |
| JP | 2006504301 A | 2/2006 |
| JP | 2006157117 A | 6/2006 |
| KR | 20010002673 A | 1/2001 |
| WO | WO9914870 A2 | 3/1999 |
| WO | WO0059123 | 10/2000 |
| WO | WO0113530 A1 | 2/2001 |
| WO | WO02097469 A1 | 12/2002 |
| WO | WO2004038955 A1 | 5/2004 |
| WO | WO2006011424 | 2/2006 |
| WO | WO2006062059 | 6/2006 |

* cited by examiner

APPARATUS AND METHOD FOR SENSOR-BASED WIRELESS RECEIVE DIVERSITY

RELATED APPLICATION

This application claims priority from U.S. Provisional Application 60/863,631, entitled "Sensor-Based GPS Receive Diversity" and filed on Oct. 31, 2006.

FIELD

This disclosure relates generally to apparatus and methods for receive diversity. In particular, this disclosure relates generally to apparatus and methods for wireless receive diversity.

BACKGROUND

In wireless communication systems, the strength and direction of the signal sources vary as the wireless unit moves in location. Most wireless units communicate through electromagnetic radio waves with a cell site base station. The signals from the cell site base station are received through an antenna mounted on the wireless unit. Typically, the antenna on a wireless unit is an approximation of an isotropic antenna. A theoretical model of an isotropic antenna radiates and receives power in all directions uniformly. In practice, a perfect isotropic antenna is not achievable. Given this pattern, the antenna radiates and receives equally well in most directions without favoring a particular direction. This results in a low antenna gain near 0 dBi.

SUMMARY

According to one aspect, a wireless unit for implementing antenna selection comprising a plurality of antennas for receiving a signal, an antenna selector for selecting one or more antennas from the plurality of antennas, an inertial sensor for sensing the orientation of the wireless unit and generating an orientation information, and a processor for processing the orientation information and commanding the antenna selector to select one or more antennas from the plurality of antennas based on the orientation information.

According to another aspect, a wireless unit for implementing receive diversity comprising a plurality of antennas for receiving a plurality of signals, at least one receiver coupled to the plurality of antennas for converting the plurality of signals into a plurality of receiver outputs, a diversity processor coupled to the at least one receiver for performing diversity processing on the plurality of receiver outputs, and an inertial sensor coupled to the diversity processor for generating an orientation information to input to the diversity processor, wherein the orientation information affects the diversity processing on the plurality of receiver outputs.

According to another aspect, a wireless unit for implementing receive diversity comprising a plurality of antennas for receiving a plurality of signals, at least one receiver coupled to the plurality of antennas for converting the plurality of signals into a plurality of receiver outputs, a first baseband processor coupled to the at least one receiver for performing baseband processing on the plurality of receiver outputs and generating a plurality of processor outputs, a diversity processor coupled to the first baseband processor for performing diversity processing on the plurality of processor outputs to recover a baseband signal, and an inertial sensor coupled to the diversity processor for generating an orientation informa-tion to input to the diversity processor, wherein the orientation information affects the diversity processing on the plurality of processor outputs.

According to another aspect, a method for implementing antenna selection comprising sensing orientation of a wireless unit, generating an orientation information based on the orientation of the wireless unit, processing the orientation information to command an antenna selector to select from a plurality of antennas, selecting one or more selected antenna from the plurality of antennas, and using the one or more selected antenna to receive a signal.

According to another aspect, a method for implementing receive diversity comprising receiving a plurality of signals, converting the plurality of signals into a plurality of receiver outputs, performing diversity processing on the plurality of receiver outputs, sensing orientation of a wireless unit, and generating an orientation information based on the orientation of the wireless unit, wherein the orientation information affects the diversity processing on the plurality of receiver outputs.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present invention and is not intended to represent the only aspects in which the present invention may be practiced. Each aspect described in this disclosure is provided merely as an example or illustration of the present invention, and should not necessarily be construed as preferred or advantageous over other aspects. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

Figure 1:
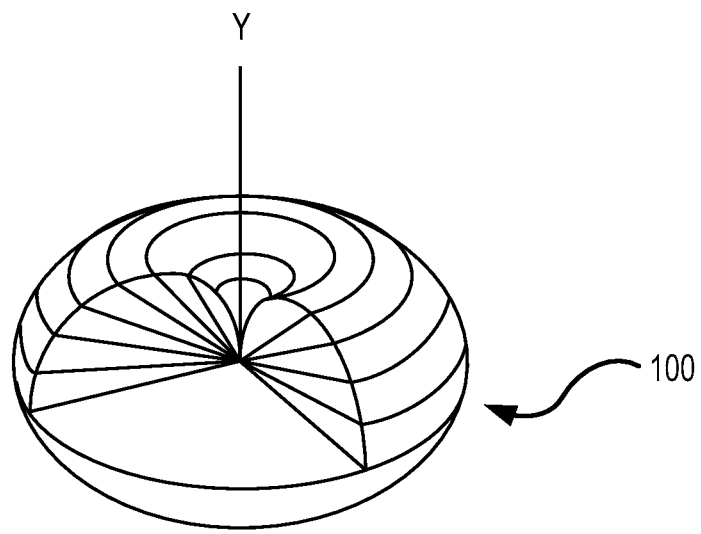
FIG. 1 is an illustration of an antenna gain pattern of an approximately isotropic antenna.
Figure 2:
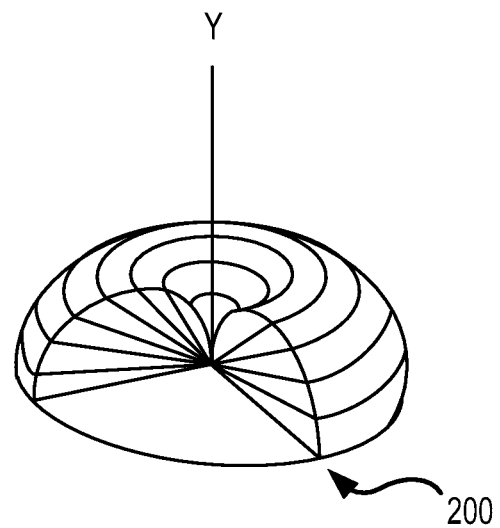
FIG. 2 is an illustration of an approximation of a hemispherical antenna gain pattern.
Figure 3:
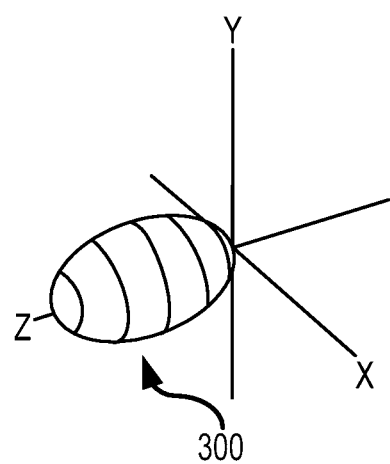
FIG. 3 is an illustration of a directional antenna gain pattern.

FIG. 1 is an illustration of an antenna gain pattern 100 of an approximately isotropic antenna. The antenna gain is approximately uniform in all directions. Thus, the approximately isotropic antenna radiates and receives power uniformly in all directions, but at a reduced antenna gain compared to other more directional antennas. For example, the antenna gain pattern 200 shown in FIG. 2 is an approximation of a hemispherical antenna gain pattern. The antenna gain pattern 200 has about a 3 dB gain increase over the antenna pattern 100 of the approximately isotropic antenna. The gain increase is due to the fact that the radiation pattern is confined to the upper hemisphere only. FIG. 3 is an illustration of a directional antenna gain pattern 300. The gain of a directional antenna is greater than that for a hemispherical antenna depending on the directivity of the antenna pattern. Examples of directional antennas include helix antenna, horn antenna, dipole array antenna, patch antenna, etc. One skilled in the art would understand that there are many examples of antennas with their respective gain patterns, and that antenna gain patterns are dependent on the directivity of the antenna patterns.

Figure 4:
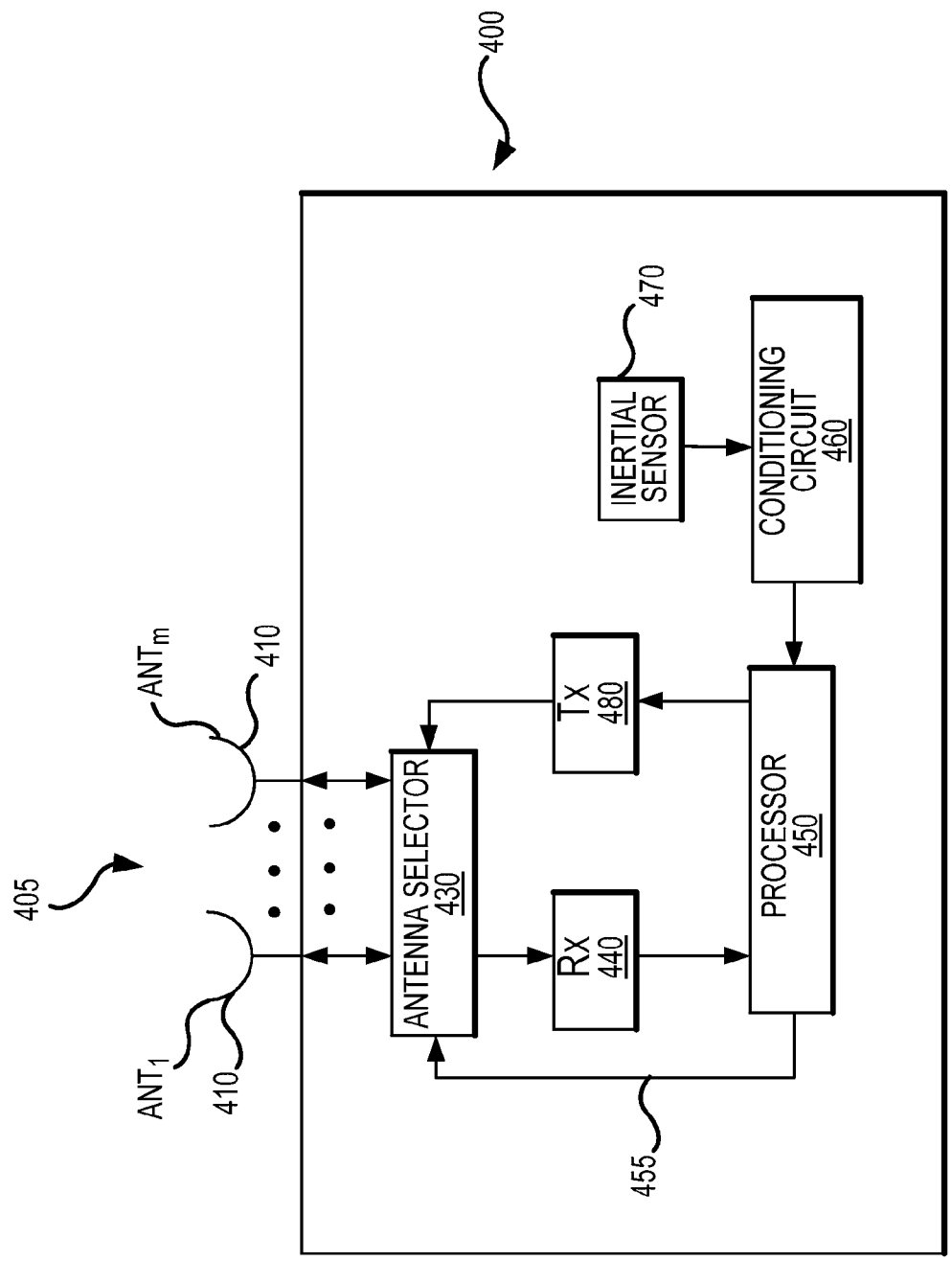
FIG. 4 is a block diagram of an aspect of a wireless unit with an inertial sensor and two antennas.

FIG. 4 is a block diagram of an aspect of a wireless unit 400 with an inertial sensor 470 and a plurality of antennas 410. One skilled in the art would understand that the quantity of antennas, as disclosed here, is not confined to a particular quantity, and that the quantity of antennas is chosen based on the particular system parameters.

In one aspect, the plurality of antennas includes at least one dual-polarized antenna. In one example, a dual-polarized antenna could include horizontal and vertical polarization to provide two diversity outputs which are then be fed into a switch, a selector, a combiner or an equivalent. In another aspect, the plurality of antennas reflects the diversity outputs of one or more dual-polarized antennas. One skilled in the art would understand that a single dual-polarized antenna could be the equivalent in spirit to two distinct, spatially separated antennas.

The signal 405 is received by one or more of the antennas 410. In one aspect, the antenna selector 430, based on an antenna selection input 455 from the processor 450, selects one or more from the plurality of antennas to receive the signal 405. The signal 405 received by the selected one or more antenna(s) is then inputted to the receiver unit 440 and then to the processor 450 for processing. In one aspect, a typical receiver unit could include one or more of the following components for processing the signal 405: a bandpass filter, a low noise amplifier (LNA), a mixer, local oscillator (LO), a low pass filter, an analog to digital converter, etc. One skilled in the art would understand that other aspects of a receiver unit are well known and would not change the scope of the present disclosure. In one aspect, a plurality of receivers is implemented with the plurality of antennas wherein the plurality of antennas could be greater in quantity to the plurality of receivers. In another aspect, the plurality of antennas is equal in quantity to the plurality of receivers. In one aspect, the plurality of receivers refers to the receiver outputs in a multi-channel receiver.

The inertial sensor 470 measures the orientation of the wireless unit 400 in an inertial reference frame. The orientation information, measured by the inertial sensor 470, is then inputted to the processor 450 to generate the antenna selection input. The orientation information measured by the inertial sensor 470 is used to support the antenna selection to improve the chance of finding the desired signal at a desirable signal strength or to improve antenna gain. For example, if the orientation of the wireless unit is known, that orientation information is used to select the antenna, and the selected antenna with higher gain can be directed to receive the desired signal in its direct path and reduce multipath effect.

Figure 5:
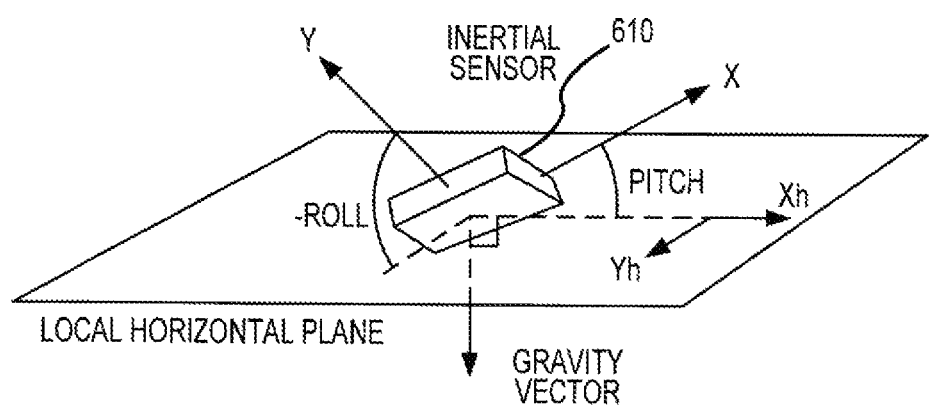
FIG. 5 illustrates the geometry of an inertial sensor relative to a horizontal plane.

FIG. 5 illustrates the geometry of an inertial sensor 610 relative to a horizontal plane. The orthogonal axis system (X-Y) of the inertial sensor 610 is compared with the orthogonal axis system ($X_h$-$Y_h$) of the horizontal plane to determine the orientation of the inertial sensor 610 relative to the horizontal plane.

Examples of inertial sensors include accelerometers, quartz sensors, gyros, etc. The orientation of the wireless unit 400 determines the selection between the antennas 410. In one aspect where two antennas are implemented, one antenna is an approximately isotropic antenna and the other antenna is a hemispheric antenna. For example, if the wireless unit 400 is in communication with base stations surrounding its geographical location, the approximately isotropic antenna may be selected because the antenna gain pattern of an isotropic antenna allows for uniform radiation in all directions. However, for example, if the wireless unit 400 is in receipt of signals from the Global Navigational Satellite System (GNSS), and the antennas of wireless unit 400 are oriented toward the GNSS satellites as determined by the inertial sensor 470, the antenna selector 430 is then directed by the processor 450 to select the hemispheric antenna to take advantage of higher antenna gain. One skilled in the art would understand that signals from GNSS satellites include but are not confined to signals from GPS satellites, and/or satellites from any other satellite system, including but not limited to, GLONASS, Galileo, COMPASS (Beidou), QZSS and IRNS. Additionally, one skilled in the art would understand that the source of the signals is not limited to GNSS and could include any wireless source, such as but not limited to, pseudolite systems, WiFi, CDMA, Bluetooth, etc.

In another example where two antennas are implemented, assume that one of the two antennas is a directional antenna. For this example, the source of the signal 405 is from a particular direction. Using the orientation information measured by the inertial sensor 470, the directional antenna of the wireless unit 400 is selected to radiate and receive signal from the desired direction of the source, maximizing the antenna gain. In another example, if signals are received from both terrestrial pseudolite sources and satellite sources, selection between two antennas (for example, a directional antenna and a hemispheric antenna) can be made based on the orientation of the wireless unit 400 as measured by the inertial sensor 470. One skilled in the art would understand that the combination of the types of antenna is numerous and its choice would depend on the design of the system and the system application.

In one aspect, a conditioning circuit 460 is used to transduce measurements from the inertial sensor 470 to a form compatible with the processor 450. For example, the output of the inertial sensor 470 may be in an analog format. The conditioning circuit 460 converts the analog data format to a digital data format for input into the processor 450. In another example the output of the inertial sensor 470 is amplified in the conditioning circuit 460 to a signal level that is acceptable for input into the processor 450. One skilled in the art would understand that different conditioning circuits with different transducing properties may be used based on the choice of inertial sensor and the processor. Also, in some aspects, a conditioning circuit may not be needed.

Figure 6:
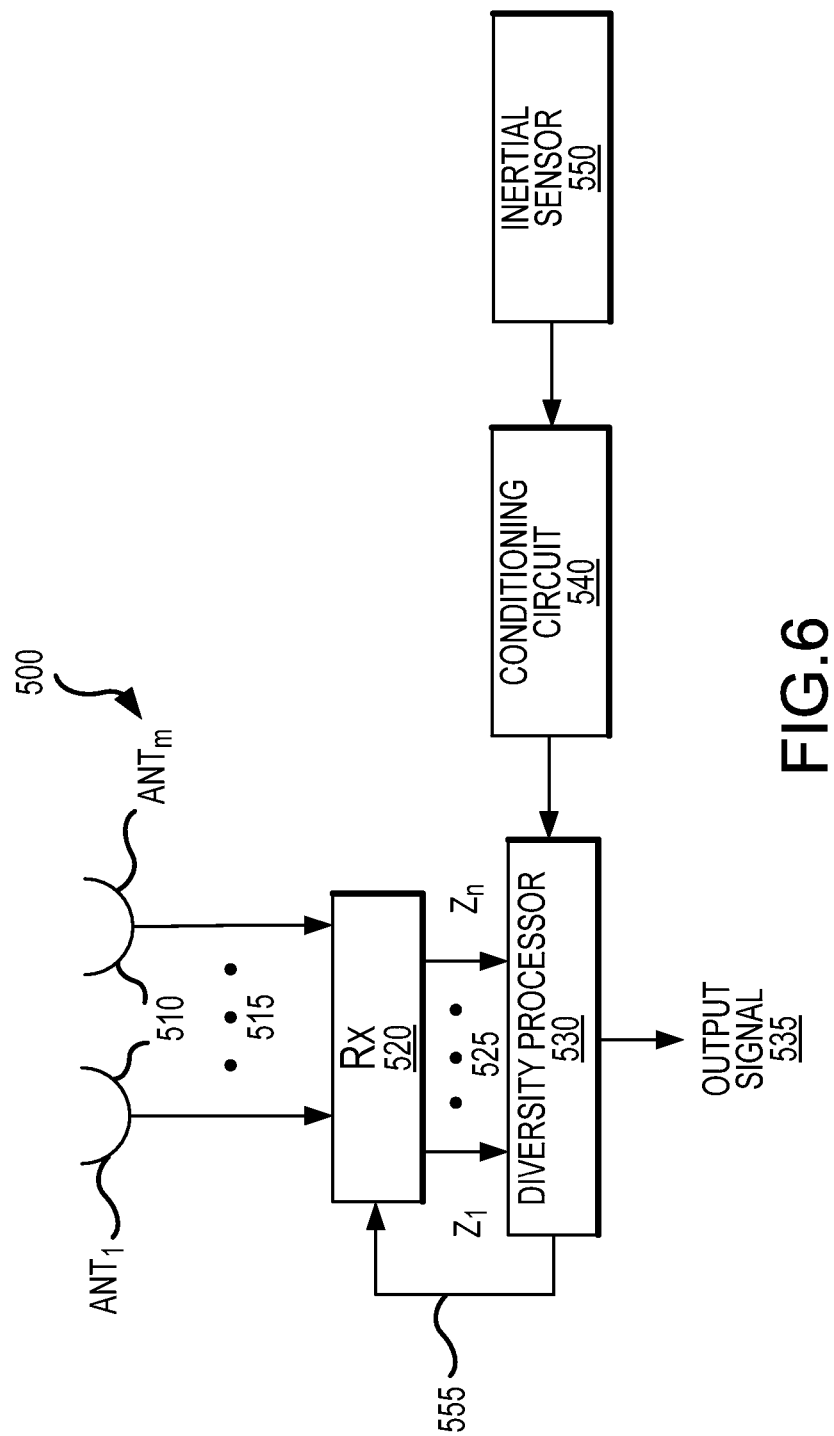
FIG. 6 is an illustration of another aspect of a wireless unit with diversity reception capability.

FIG. 6 is an illustration of another aspect of a wireless unit 500 with diversity reception capability. As illustrated in FIG. 6, the wireless unit 500 includes at least m antennas ($Ant_1$ ... $Ant_m$). In one example, the quantity m equals 2. Other quantities of antennas where m>2 may be desirable depending on the system parameters. The wireless unit 500 also includes a multi-channel receiver 520 to receive a plurality of signals 515 and to convert the plurality of signals 515 into received formats. In one aspect, the multi-channel receiver 520 includes one or more of the following components for processing the plurality of signals 515: a bandpass filter, a low noise amplifier (LNA), a mixer, local oscillator (LO), a low pass filter, an analog to digital converter, etc. One skilled in the art would understand that other aspects of a multi-channel receiver are well known and would not change the scope of the present disclosure.

The receiver outputs ($Z_1$ ... $Z_n$) 525 of the multi-channel receiver 520 are inputted into a diversity processor 530. The diversity processor 530 processes the receiver outputs ($Z_1$ ... $Z_n$) 525 into an output signal 535. In one aspect, the output signal 535 is further digitally processed to suit the system application. One skilled in the art would understand that the quantity of receiver outputs ($Z_1$ ... $Z_n$) 525 corresponds to the quantity of active antennas 510 ($Ant_1$ ... $Ant_m$). In this case, n=m. However, in one aspect, the quantity of receiver outputs n is less than the quantity of antennas implemented m, i.e., n<m. For example, one implementation could include one receiver and two antennas to choose from. Additionally, in one aspect, n>m. One skilled in the art would understand that the implementation of a multi-channel receiver could vary without affecting functionality. For example, a receiver with multi-channel capabilities could be implemented with multiple single channel receivers without affecting functionality.

In one aspect, the diversity processor 530 computes the weighted average of the receiver outputs ($Z_1$ ... $Z_n$) 525 and outputs an output signal 535 representative of that weighted average. In one example, the output signal 535 (labeled here as Y) is defined as $Y = \Sigma W_i Z_i$ where i=1 ... n in the case where n=1, there is no diversity combining. One skilled in the art would understand that many other examples of diversity processing are well known and the particular choice of a diversity processing is based on the particulars of the system design. In one aspect, the receiver outputs ($Z_1$ ... $Z_n$) 525 are coherently combined with their phase offset from each other estimated. In another aspect, the receiver outputs ($Z_1$ ... $Z_n$) 525 are non-coherently combined. In one aspect, an antenna selection input 555 from the diversity processor 530 is received by the multi-channel receiver 520 to implement selection of which antennas 510 ($Ant_1$ ... $Ant_n$) to use. The antenna selection input 555 is based on results measured by the inertial sensor 550.

Figure 7:
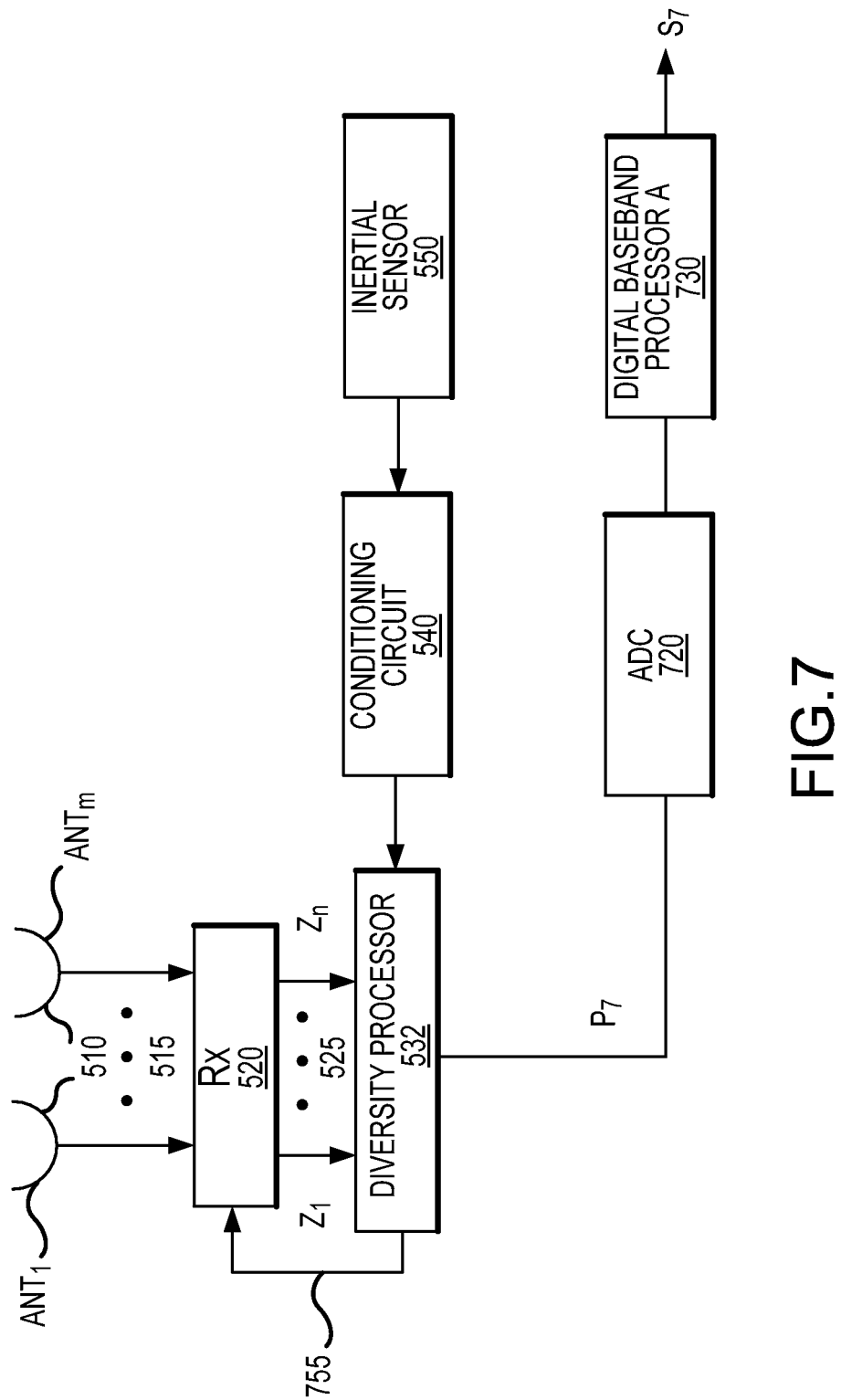
FIG. 7 is a block diagram of an aspect of a wireless unit with baseband processing capability.

FIG. 7 is a block diagram of an aspect of the wireless unit with baseband processing capability. In one aspect, the diversity processor is in analog format and includes an analog phase rotator and diversity combiner. Following the analog diversity processor 532 (shown in FIG. 7), the output $P_7$ is converted from analog format to digital format by ADC 720 and then processed by the digital baseband processor A 730 to output a baseband signal S7. In one aspect, the ADC 720 includes a sampler and a quantizer to convert the analog format input to digital format. In one aspect, the digital baseband processor A 730 performs phase rotation, despreading, coherent accumulation and non-coherent accumulation to recover the baseband signal S7. In one aspect, an antenna selection input 755 from the diversity processor 532 is received by the multi-channel receiver 520 to implement selection of which antennas 510 ($Ant_1$ ... $Ant_m$) to use. The antenna selection input 755 is based on results measured by the inertial sensor 550.

Figure 8:
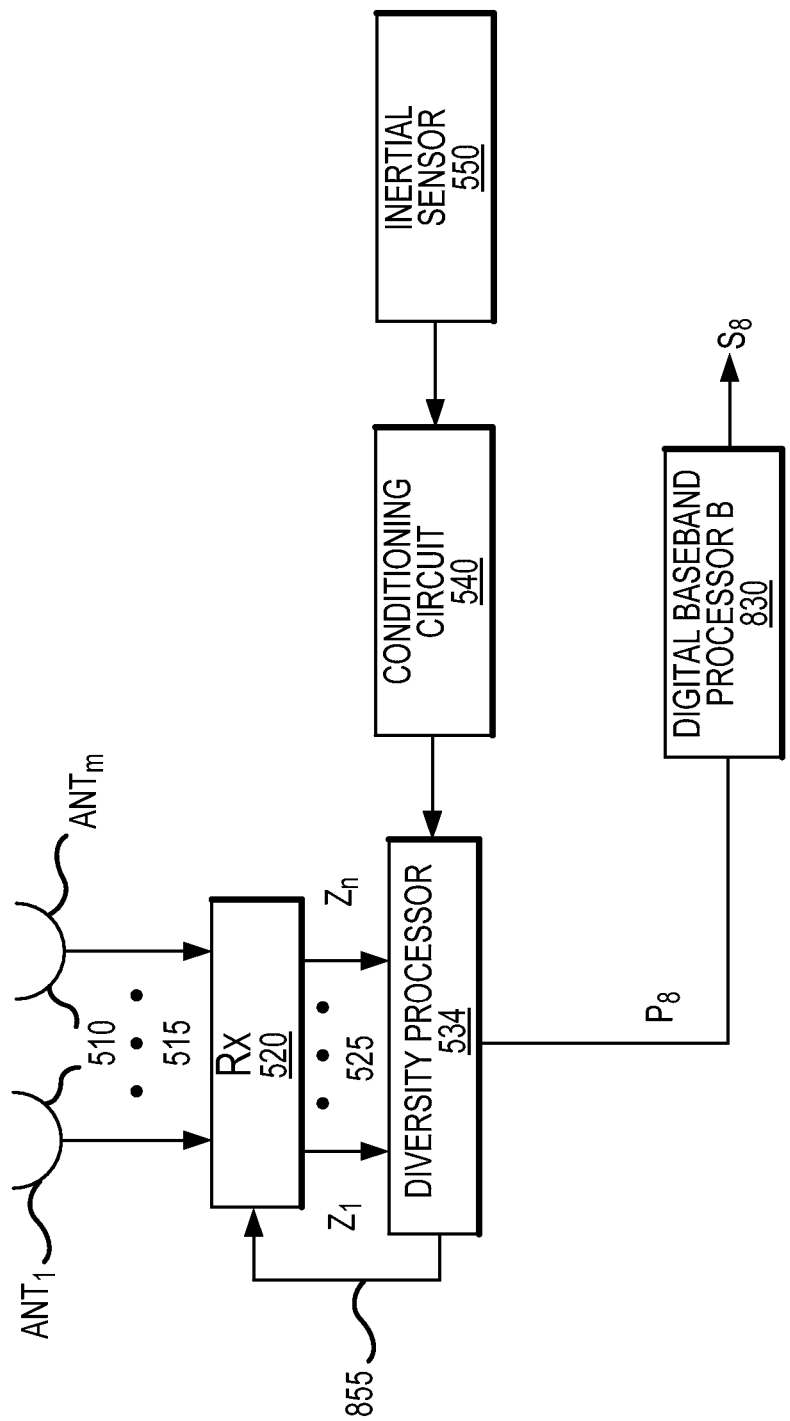
FIG. 8 is a block diagram of a second aspect of a with baseband processing capability.

FIG. 8 is a block diagram of a second aspect of the wireless unit with baseband processing capability. Shown in FIG. 8, the diversity processor 534 is in digital format and performs coherent sampling and diversity combining on the receiver outputs ($Z_1$ ... $Z_n$) 525. In another aspect, the coherent sampling may be performed by a separate unit (not shown) coupled to the diversity processor 534. One skilled in the art would understand that there are various implementations known which can be employed without affecting the scope of the disclosure. In one aspect, the digital baseband processor B 830 performs phase rotation, despreading, coherent accumulation and non-coherent accumulation on the output $P_8$ to recover the baseband signal Ss. In one aspect, an antenna selection input 855 from the diversity processor 534 is received by the multi-channel receiver 520 to implement selection of which antennas 510 ($Ant_1$ ... $Ant_m$) to use. The antenna selection input 855 is based on results measured by the inertial sensor 550.

Figure 9:
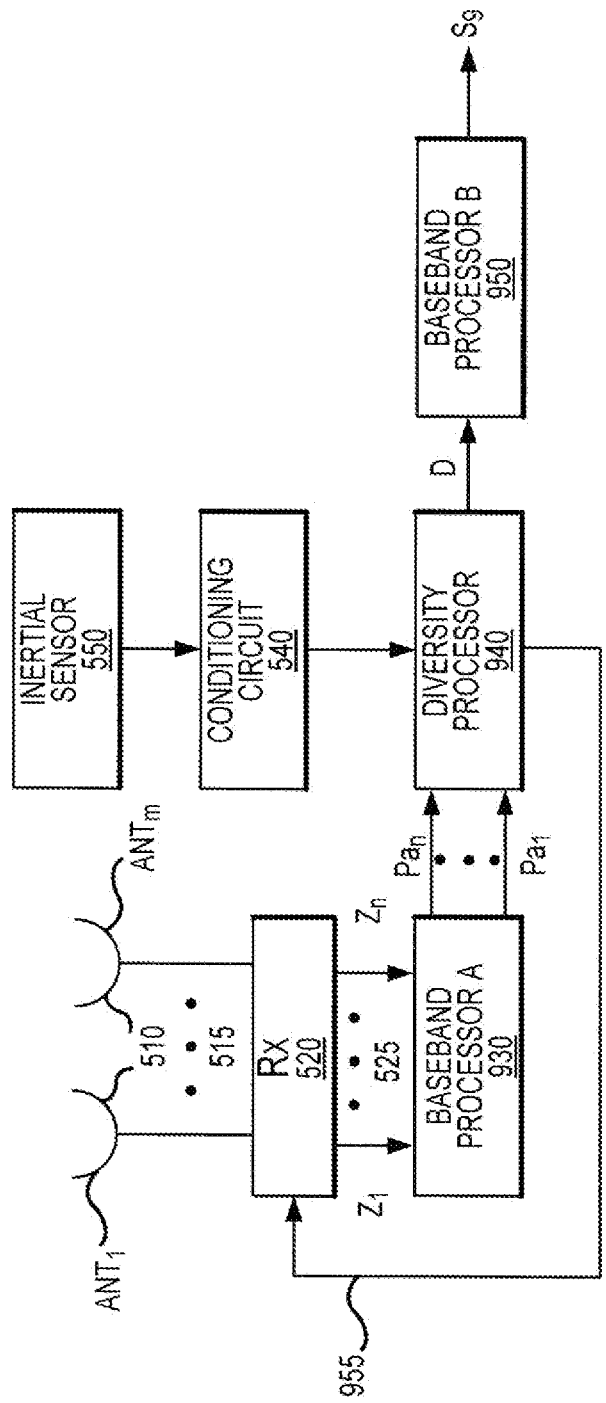
FIG. 9 is a block diagram of a third aspect of a wireless unit with baseband processing capability.

FIG. 9 is a block diagram of a third aspect of a wireless unit with baseband processing capability. In one aspect, the diversity processor 940 is in digital format. Baseband processor A 930 receives receiver outputs ($Z_1$ ... $Z_n$) 525 for baseband processing, and outputs processor A outputs ($Pa_1$ ... $Pa_n$) which are inputted to the diversity processor 940. The diversity processor output D from the diversity processor 940 is then inputted to baseband processor B 950 for further processing to recover baseband signal $S_9$. One skilled in the art would understand that baseband processor A 930 and baseband processor B 950 can be implemented either by a single processor unit or by separate processor units. In one aspect, baseband processor A 930, diversity processor 940 and baseband processor B 950 are all implemented by a single processor unit.

In one aspect, the baseband processing performed by the baseband processor A 930 includes phase rotation, despreading and coherent accumulation of each receiver outputs ($Z_1$ ... $Z_n$) 525. Shown in FIG. 9, processor A outputs ($Pa_1$ ... $Pa_n$) are inputted into the diversity processor 940. In one aspect, the diversity processing performed by the diversity processor 940 includes accumulating the processor A outputs ($Pa_1$ ... $Pa_n$) and diversity combining them. In one aspect, the diversity processor 940 coherently accumulates the processor A outputs ($Pa_1$ ... $Pa_n$). The diversity processor output D is inputted to baseband processor B 950. In one aspect, processor B 950 performs further coherent accumulation and non-coherent accumulation to recover baseband signal $S_9$. One skilled in the art would understand that the quantity of processor A outputs ($Pa_1$ ... $Pa_n$) corresponds to the quantity of receiver outputs ($Z_1$ ... $Z_n$) 525. In one aspect, an antenna selection input 955 from the diversity processor 940 is received by the multi-channel receiver 520 to implement selection of which antennas 510 ($Ant_1$ ... $Ant_m$) to use. The antenna selection input 955 is based on results measured by the inertial sensor 550.

Figure 10:
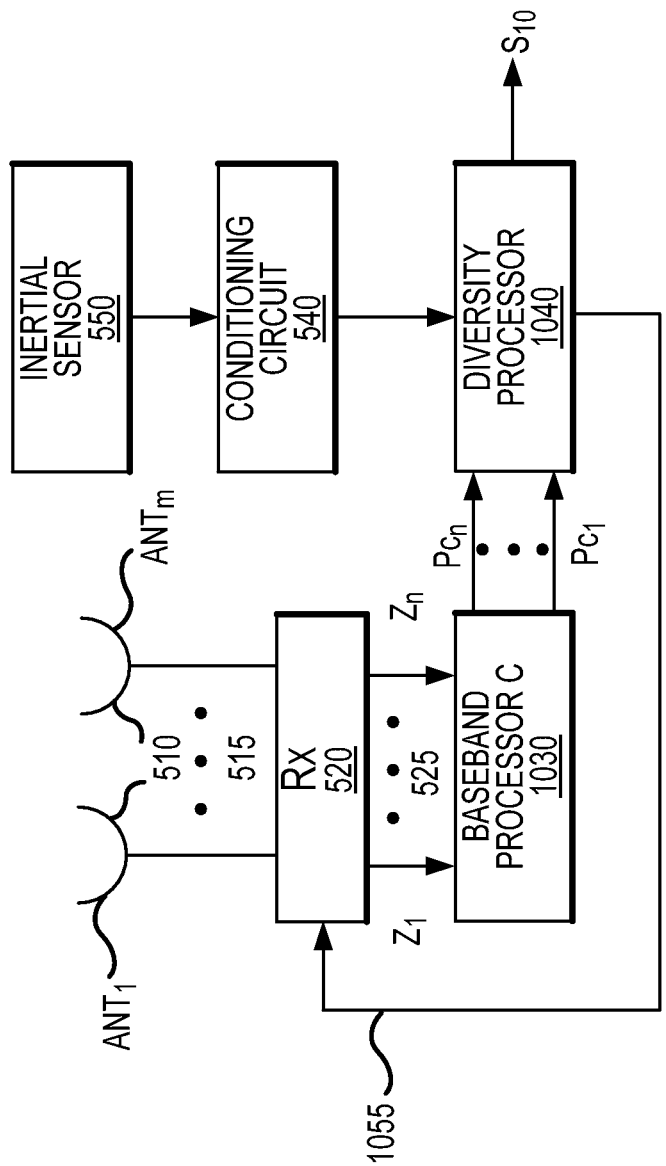
FIG. 10 is a block diagram of a fourth aspect of a wireless unit with baseband processing capability.

FIG. 10 is a block diagram of a fourth aspect of a wireless unit with baseband processing capability. In one aspect, the diversity combining is done non-coherently. In FIG. 10, the receiver outputs ($Z_1$ ... $Z_n$) 525 are inputted into baseband processor C 1030. Baseband processor C 1030 phase rotates, despreads, coherently accumulates and non-coherently accumulates the receiver outputs ($Z_1$ ... $Z_n$) 525 to generate processor C outputs ($Pc_1$ ... $Pc_n$). Processor C outputs ($Pc_1$ ... $Pc_n$) are then inputted to the diversity processor 1040 which non-coherently accumulates the processor C outputs ($Pc_1 \ldots Pc_n$) and non-coherently diversity combines them to recover baseband signal $S_{10}$. One skilled in the art would understand that baseband processor C 1030 and diversity processor 1040 can be implemented either by a single processor unit or by separate processor units. In one aspect, an antenna selection input 1055 from the diversity processor 1040 is received by the multi-channel receiver 520 to implement selection of which antennas 510 ($Ant_1 \ldots Ant_m$) to use. The antenna selection input 1055 is based on results measured by the inertial sensor 550.

As shown in FIGS. 6-10, the wireless unit includes an inertial sensor 550 which measures the orientation of the wireless unit in an inertial reference frame. Examples of inertial sensors include accelerometers, quartz sensors, gyros, etc. Based on the measured orientation of the wireless unit, an orientation information is generated by the inertial sensor and inputted to the diversity processor. In one aspect, the orientation information affects how the diversity processor processes and combines its inputs. Depending on the orientation of the wireless unit relative to one or more of the signal sources (which is embedded in the orientation information), different weighting coefficients may be applied to one or more of the inputs. In the aspects shown in FIGS. 6-8, the inputs to the diversity processor 530, 532, 534 are receiver outputs ($Z_1 \ldots Z_n$) 525. In the aspect shown in FIG. 9, the inputs to the diversity processor 940 are processor A outputs ($Pa_1 \ldots Pa_n$). And, in the aspect shown in FIG. 10, the inputs to the diversity processor 1040 are processor C outputs ($Pc_1 \ldots Pc_n$). In one aspect, the orientation information affects the selection of antennas 510 ($Ant_1 \ldots Ant_m$) to use as implemented by the antenna selection input.

In one aspect, a conditioning circuit 540 is used to transduce measurements from the inertial sensor 550 to a form compatible with the diversity processor. For example, the output of the inertial sensor 550 may be in an analog format. The conditioning circuit 540 converts the analog data format to a digital data format for input into the diversity processor. In another example the output of the inertial sensor 550 is amplified in the conditioning circuit 540 to a signal level that is acceptable for input into the diversity processor. One skilled in the art would understand that different conditioning circuits with different transducing properties may be used based on the choice of inertial sensor and the processor.

The various illustrative logical blocks, modules, and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules, and circuits described herein may also include machine readable medium for storing software. The machine readable medium may also include one or more storage devices, a transmission line, or a carrier wave that encodes a data signal.

The previous description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention.

The invention claimed is:

1. A wireless unit for implementing antenna selection comprising:
   a plurality of antennas for receiving a signal wherein the signal comprises a GNSS (Global Navigational Satellite System) signal and wherein the plurality of antennas comprises a combination of types of antennas comprising a directional antenna and a non-directional antenna, wherein the directional antenna and a non-directional antenna comprise a hemispheric antenna and an isotropic antenna;
   an antenna selector for selecting one of the directional antenna and the non-directional antenna from the plurality of antennas;
   an inertial sensor for sensing the orientation of the wireless unit and generating orientation information; and
   a processor for processing the orientation information and commanding the antenna selector to select the one of the directional antenna and the non-directional antenna from the plurality of antennas based on the orientation information.

2. The wireless unit of claim 1 wherein the plurality of antennas includes one or more dual-polarized antennas.

3. The wireless unit of claim 1 further comprising a plurality of receivers for receiving the signal from the plurality of antennas, wherein the plurality of antennas is greater than the plurality of receivers.

4. The wireless unit of claim 1 further comprising a plurality of receivers for receiving the signal from the plurality of antennas, wherein the plurality of antennas is equals than the plurality of receivers.

5. The wireless unit of claim 1 wherein the inertial sensor is an accelerometer.

6. A wireless unit for implementing receive diversity comprising:
   a plurality of antennas for receiving a plurality of signals wherein the plurality of signals comprises GNSS (Global Navigational Satellite System) signals and wherein the plurality of antennas comprises a combination of types of antennas comprising a directional antenna and a non-directional antenna, wherein the directional antenna and a non-directional antenna comprise a hemispheric antenna and an isotropic antenna;
   at least one receiver coupled to the plurality of antennas for converting the plurality of signals from the directional antenna and the non-directional antenna into a plurality of receiver outputs;
   a diversity processor coupled to the at least one receiver for performing diversity processing on the plurality of receiver outputs; and
   an inertial sensor coupled to the diversity processor for generating orientation information to input to the diversity processor, wherein the orientation information affects the diversity processing on the plurality of receiver outputs.

7. The wireless unit of claim 6 wherein the diversity processor performs a weighted average processing on the plurality of receiver outputs.

8. The wireless unit of claim 6 wherein the diversity processor is in analog format and includes an analog phase rotator and diversity combiner.

9. The wireless unit of claim 8 further comprising a digital baseband processor coupled to the diversity processor for performing phase rotation and dispreading to recover a baseband signal.

10. The wireless unit of claim 9 wherein the digital baseband processor further performs coherent accumulation to recover the baseband signal.

11. The wireless unit of claim 6 further comprising a digital baseband processor coupled to the diversity processor for performing phase rotation and dispreading to recover a baseband signal, and wherein the diversity processor coherently samples and diversity combines the plurality of receiver outputs.

12. A wireless unit for implementing receive diversity comprising:
   a plurality of antennas for receiving a plurality of signals wherein the plurality of signals comprises GNSS (Global Navigational Satellite System) signals and wherein the plurality of antennas comprises a combination of types of antennas comprising a directional antenna and a non-directional antenna, wherein the directional antenna and a non-directional antenna comprise a hemispheric antenna and an isotropic antenna;
   at least one receiver coupled to the plurality of antennas for converting the plurality of signals from the directional antenna and the non-directional antenna into a plurality of receiver outputs;
   a first baseband processor coupled to the at least one receiver for performing baseband processing on the plurality of receiver outputs and generating a plurality of processor outputs;
   a diversity processor coupled to the first baseband processor for performing diversity processing on the plurality of processor outputs to recover a baseband signal; and
   an inertial sensor coupled to the diversity processor for generating orientation information to input to the diversity processor, wherein the orientation information affects the diversity processing on the plurality of processor outputs.

13. The wireless unit of claim 12 wherein the baseband processing includes performing phase rotation and dispreading on the plurality of receiver outputs.

14. The wireless unit of claim 12 wherein the diversity processing includes performing accumulation and diversity combining on the plurality of processor outputs.

15. A method for implementing antenna selection comprising:
   sensing orientation of a wireless unit;
   generating orientation information based on the orientation of the wireless unit;
   processing the orientation information to command an antenna selector to select from a plurality of antennas, wherein the plurality of antennas comprises an isotropic antenna and a hemispheric antenna;
   selecting one of the isotropic antenna and the hemispheric antenna from the plurality of antennas based on the sensed orientation; and
   using the antenna to receive a signal wherein the signal comprises a GNSS (Global Navigational Satellite System) signal.

16. A method for implementing receive diversity comprising:
   receiving a plurality of signals from a plurality of antennas wherein the plurality of signals comprises GNSS (Global Navigational Satellite System) signals and wherein the plurality of antennas comprises an isotropic antenna and a hemispheric antenna;
   converting the plurality of signals from the isotropic antenna and the hemispheric antenna into a plurality of receiver outputs;
   performing diversity processing on the plurality of receiver outputs;
   sensing orientation of a wireless unit; and
   generating orientation information based on the orientation of the wireless unit, wherein the orientation information affects the diversity processing on the plurality of receiver outputs.

17. The wireless unit of claim 1 wherein the non-directional antenna comprises the isotropic antenna.

18. The wireless unit of claim 1 wherein the non-directional antenna comprises the hemispheric antenna.

19. The wireless unit of claim 6 wherein the non-directional antenna comprises the isotropic antenna.

20. The wireless unit of claim 6 wherein the non-directional antenna comprises the hemispheric antenna.

21. The wireless unit of claim 12 wherein the non-directional antenna comprises the isotropic antenna.

22. The wireless unit of claim 12 wherein the non-directional antenna comprises the hemispheric antenna.

23. A method for implementing antenna selection comprising:
   means for sensing orientation of a wireless unit;
   means for generating orientation information based on the orientation of the wireless unit;
   means for processing the orientation information to command an antenna selector to select from a plurality of antennas wherein the plurality of antennas comprises a combination of types of antennas comprising an isotropic antenna and a hemispheric antenna;
   means for selecting one of the isotropic antenna and the hemispheric antenna from the plurality of antennas based on the sensed orientation; and
   means for using the antenna to receive a signal wherein the signal comprises a GNSS (Global Navigational Satellite System) signal.

24. The wireless unit of claim 1, further comprising
   a plurality of receivers for receiving the signal from the plurality of antennas;
   wherein the plurality of antennas is greater than or equal to the plurality of receivers; and
   wherein the inertial sensor is an accelerometer.

* * * * *